No. 609,183. Patented Aug. 16, 1898.
G. A. & R. F. DUNN.
SPRAYING APPARATUS.
(Application filed Jan. 21, 1898.)

(No Model.)

Witnesses,

Inventors,
George A. Dunn
Robert F. Dunn
By Dewey & Co.
Attys.

THE NORRIS PETERS CO., PHOTO-LITHO., WASHINGTON, D. C.

UNITED STATES PATENT OFFICE.

GEORGE A. DUNN AND ROBERT F. DUNN, OF DINUBA, CALIFORNIA, ASSIGNORS OF ONE-THIRD TO W. A. CONN, OF FRESNO, CALIFORNIA.

SPRAYING APPARATUS.

SPECIFICATION forming part of Letters Patent No. 609,183, dated August 16, 1898.

Application filed January 21, 1898. Serial No. 667,414. (No model.)

*To all whom it may concern:*

Be it known that we, GEORGE A. DUNN, a citizen of Canada, and ROBERT F. DUNN, a citizen of the United States, both residing at Dinuba, county of Tulare, State of California, have invented an Improvement in Spraying Apparatus; and we hereby declare the following to be a full, clear, and exact description of the same.

Our invention relates to an apparatus which is designed for the purpose of spraying trees and plants with mixtures or solutions which are intended to destroy insects and vermin and to otherwise improve the condition of the trees or plants thus sprayed.

It consists, essentially, in the novel construction of the tank or vessel containing the solution, a means for strengthening and cheapening the construction thereof, and, in combination therewith, of an air-forcing pump with means for reversing the flow of the air into the tank, means for straining the liquid before it is discharged, means for cleaning the strainer in case it becomes clogged, and in details of construction which will be more fully explained by reference to the accompanying drawings, in which—

Figure 1:
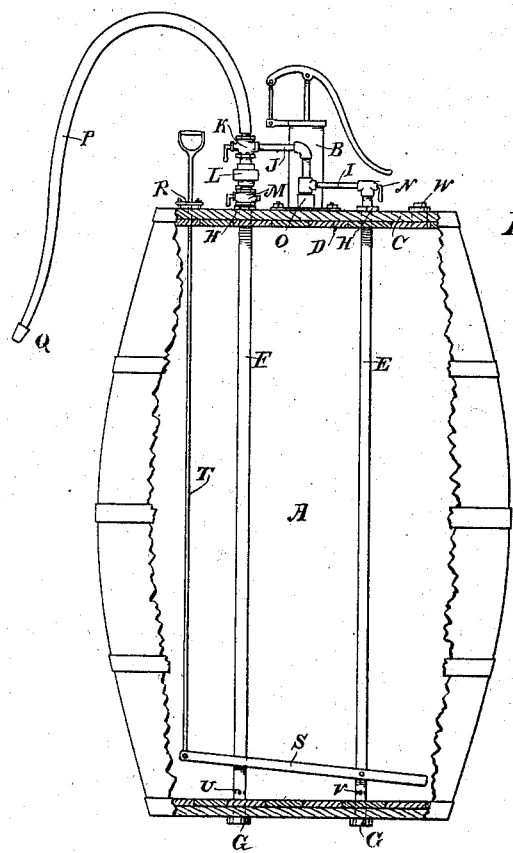
Figure 2:
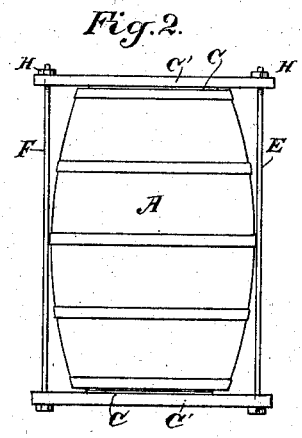
Figure 3:
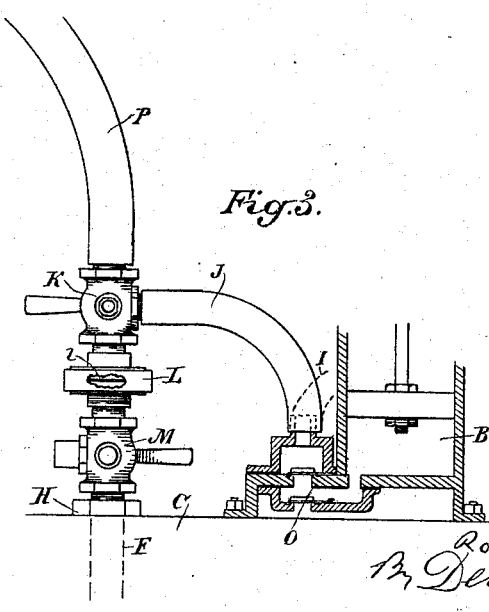

Figure 1 is a sectional view of the tank or barrel, showing the invention. Fig. 2 is a modification of the strengthening devices applied to the barrel. Fig. 3 is an enlarged detail of the pump and connecting mechanism.

For the purpose of containing the liquid to be used we employ an air-tight tank or reservoir, which may be made of wood, iron, or steel, of sufficient strength to withstand the internal pressure, and into this is placed the spraying solution, which can be introduced at any time through an inlet provided with a removable stopper, as shown at W, when no pressure is on.

The tank A is here shown as being made in the form of a barrel having wooden staves with exterior hoops, as this is cheaper than a specially-constructed tank. In order to strengthen this barrel to enable it to resist the interior pressure, we fix a piece of plank or an iron plate C at each end of the barrel, so that these plates will lie at right angles or crosswise of the pieces forming the heads D of the barrel. In order to secure these pieces and to insure the proper resisting force, these strengthening-pieces are held firmly in place by one or more rods E F, which, as shown in Fig. 2, extend exterior to the barrel and pass through bars C', which rest upon the strengthening-pieces C, the latter, as before described, resting upon the heads of the barrel.

By means of suitable nuts H, fitting upon the ends of the rods, any desired degree of tension may be produced, and a corresponding pressure upon the strengthening-pieces C will be sufficient to resist any strain which might otherwise dislodge the heads.

In Fig. 1 the connecting-rods E and F are shown as being made tubular and extending through the heads D and the strengthening-pieces C and having upon the lower ends the enlargements or cap-pieces G. Between the heads or strengthening-pieces or otherwise fitting these pipes is suitable packing which will prevent any leakage at the points where they pass through the heads. These tubes have perforations, as shown at U and V, made in them near the bottom or lower head of the barrel for the purpose of admitting the air, which is forced into the barrel by means of the air-pump B.

The nuts H in this case screw upon the threaded upper ends of the pipes E and F, and thus secure them firmly in place.

The upper end of the pipe E is connected by a rubber or flexible connection I with the valve-chamber O of the pump B, and a stop-cock N is so arranged that communication between the connection I and the pipe E may be cut off when desired, as will be hereinafter described.

From the valve-chamber a second rubber or flexible connecting-pipe J extends, and its outer end unites with a three-way cock K.

Where the pipe F emerges through the upper head of the barrel is a stop-cock M, and above this is what is termed a "union" L. Within this union is fitted a screen *l*, which is designed to prevent any solid matter escaping from the tank. The upper part of the union connects with the three-way cock K, and from the opposite side of this cock extends the flexible spray-pipe P, having any suitable or desired form of nozzle Q.

S is an agitator suitably fulcrumed in the lower part of the tank and having its opposite end connected with a rod T, extending up through a stuffing-box R and provided with a handle at the upper end by which it can be moved up and down through the stuffing-box, so as to operate the agitator when the latter is needed. In most cases, however, a sufficient agitation of the liquid is produced by the passage of the air discharged through the outlet-openings V in the pipe E.

The operation of the device will then be as follows: The three-way cock K is turned so as to provide a communication directly from the pipe F to the discharge-pipe P, the stop-cocks M and N being also open. The pump being now set into operation, air is pumped into the chamber O and escapes thence through the flexible connecting-pipe I, and the valve N into the pipe E, which extends to the bottom of the tank, and the air discharged through the openings V keeps up a constant agitation of the liquid contents of the tank. This agitation may be increased, if found necessary or desirable, by operating the mechanical agitator S, as previously described. The liquid thus agitated will be forced by the pressure of the air which rises to the upper part of the tank to flow into the pipe F, and thence out through the strainer L and the discharge-pipe, which, being flexible, allows the nozzle to be directed to any desired point.

If for any reason the strainer L becomes clogged, the valve N is closed and the cock K is turned so as to connect the flexible connecting-pipe J directly with the passage downward through the strainer L, the connection with the discharge-pipe P being temporarily cut off. The pressure of air may then be forced downward through the strainer, and this will ordinarily disengage any substance by which the strainer may be clogged. The material thus dislodged may be either forced downwardly into the pipe F or by means of an opening in that part of the pipe below the union and exterior to the barrel or tank the clogging substance may be discharged directly and outside of the tank.

If for any reason it be found necessary to remove the strainer entirely, it is only necessary to unscrew the union L after closing the stop cock M, so that the pressure will remain within the tank, and the strainer can then be taken out and cleansed or a new one substituted, there being no loss of pressure from within the tank by this operation.

The flexibility of the connections I and J enables the parts to be all disengaged whenever necessary, and by closing the stop-cocks M and N the pressure in the interior of the tank will not be disturbed. All parts of the apparatus are thus placed within easy reach, and by the arrangement here shown we are enabled to pump air into the tank and force the contents out with any degree of pressure without passing the material through the pump, which in many cases would be injurious to it.

Having thus described our invention, what we claim as new, and desire to secure by Letters Patent, is—

1. In a spraying apparatus, the combination, of a tank, inlet and outlet passages extending to the bottom thereof, one of said passages having perforations for the admission of air to the tank and the other having perforations for the escape of liquid, under pressure, from said tank, a pump having a valve-chamber, and a valve-controlled connection between said chamber and one of said passages whereby air may be forced therethrough into the tank, said liquid discharging through the other passage without coming in contact with the pump.

2. In a spraying apparatus, a tank having an inlet-pipe extending from the top to the bottom with perforations near the bottom for the passage of air whereby the contents of the tank are agitated and a pressure established within the tank, a discharge-pipe also extending from the top to the bottom of the tank and having perforations for the passage of the liquid into it, a discharge-pipe connecting with said pipe exterior to the tank, a pump having a valve-chamber, connections between said chamber and the inlet-pipe and also with the outlet-pipe, cocks by which said pipes may be independently closed or opened whereby the discharge of air may be diverted to either of said pipes.

3. In a spraying apparatus, an air-tight containing-tank, an inlet and a discharge pipe extending from the top to near the bottom of the interior of the tank having perforations near the bottom through which air is discharged into the tank from the inlet-pipe, and the liquid under the pressure thus generated is forced into the outlet-pipe, a strainer fixed in the outlet-pipe exterior to the tank, a discharge-pipe connecting with the pipe above the strainer, a pump having a valve-chamber, connections between said valve-chamber and the inlet-pipe and also with the outlet-pipe, a three-way cock with which said pipe connects and by which air may be directed through the strainer, and a cock in the inlet-pipe whereby the passage of air therethrough can at the same time be prevented.

4. In a spraying apparatus, an air-tight tank, inlet and outlet pipes disposed as shown, a pump connecting with both inlet and outlet pipes exterior to the tank, cocks whereby the connection with either of said pipes may be opened or closed, a strainer interposed between the connection with the outlet-pipe and the tank, and cocks whereby the air may be cut off from the inlet-pipe and directed into the outlet-pipe above the strainer so as to discharge air therethrough to clear the strainer.

5. In a spraying apparatus, a tank having inlet and outlet pipes with controlling-cocks, an air-pump and flexible connections between the air-pump and each of said pipes, a strainer interposed in the outlet-pipe between the air-inlet passage and the tank whereby air may be forced backwardly through the strainer to clear it out, and both inlet and outlet pipes may be closed to maintain a pressure within the tank and allow the disengagement of the flexible connecting-pipes without loss of pressure.

6. In a spraying apparatus, an air-tight tank, pipes extending from the top to the bottom thereof, an air-pump and flexible connections between it and both inlet and outlet pipes and perforations made in the lower ends of said pipes within the tank whereby air may be forced therethrough to agitate the contained liquid and produce an internal pressure within the tank.

7. In a spraying apparatus of the character described, inlet and outlet pipes with perforations at the bottom and connected air-pump for the injection of air into the tank and a supplemental mechanical agitator situated within the tank and having a connecting-rod extending therefrom through the stuffing-box at the upper end as herein described.

8. In a spraying apparatus, a barrel-shaped tank having flat heads, strengthening-plates fitting the exterior of said heads, tubes extending through said plates and heads having closed caps at the lower end and nuts fitting the screw-threaded exterior at the upper end and turnable so as to force the strengthening-plates against the heads, said tubes having perforations near the bottom interior to the barrel, an air-pump having flexible connections with said tubes, cocks whereby the air from the pump may be delivered through the inlet-pipe to agitate the contained liquid and provide an interior pressure, similar perforations in the outlet-pipe for the escape of the liquid, a strainer interposed between the air-passage of the outlet-pipe and the interior of the tank and cocks whereby the air may be diverted from the inlet-pipe to pass backward through the strainer to the outlet-pipe.

In witness whereof we have hereunto set our hands.

GEORGE A. DUNN.
ROBERT F. DUNN.

Witnesses:
JOHN FAIRWEATHER,
J. H. FAIRWEATHER.